US007186455B2

(12) United States Patent
Murschall et al.

(10) Patent No.: US 7,186,455 B2
(45) Date of Patent: *Mar. 6, 2007

(54) WHITE FLAME-RESISTANT UV-STABLE FILM MADE FROM A CRYSTALLIZABLE THERMOPLASTIC, A METHOD FOR PRODUCTION AND THE USE THEREOF

(75) Inventors: Ursula Murschall, Nierstein (DE); Andreas Stopp, Ingelheim (DE); Guenther Crass, Taunusstein (DE); Ulrich Kern, Ingelheim (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 469 days.

This patent is subject to a terminal disclaimer.

(21) Appl. No.: 10/181,505

(22) PCT Filed: Jan. 11, 2001

(86) PCT No.: PCT/EP01/00274

§ 371 (c)(1),
(2), (4) Date: Jul. 18, 2002

(87) PCT Pub. No.: WO01/53395

PCT Pub. Date: Jul. 26, 2001

(65) Prior Publication Data

US 2003/0055136 A1    Mar. 20, 2003

(30) Foreign Application Priority Data

Jan. 20, 2000   (DE) ............................... 100 02 163

(51) Int. Cl.
B32B 7/02     (2006.01)
B32B 27/20    (2006.01)
B32B 27/36    (2006.01)
B32B 37/15    (2006.01)

(52) U.S. Cl. ..................... 428/212; 428/323; 428/328; 428/330; 428/331; 428/403; 428/404; 428/480; 428/910; 106/15.05; 106/18.11; 106/18.14; 106/18.18; 106/18.31; 264/288.4; 264/290.2

(58) Field of Classification Search ................ 428/480, 428/916, 323, 330, 324, 331; 264/280, 288.4, 264/290.2, 289, 6; 106/15.05, 18.11, 18.14, 106/18.18, 18.31

See application file for complete search history.

(56) References Cited

U.S. PATENT DOCUMENTS

| | | | | |
|---|---|---|---|---|
| 3,322,716 A | * | 5/1967 | Klein et al. | 524/135 |
| 3,873,496 A | * | 3/1975 | Hills | 524/120 |
| 3,944,633 A | * | 3/1976 | Gresham | 558/74 |
| 4,102,853 A | * | 7/1978 | Kawamura et al. | 524/425 |
| 5,043,402 A | * | 8/1991 | Watanabe et al. | 525/444 |
| 5,173,357 A | * | 12/1992 | Nakane et al. | 428/220 |
| 5,248,713 A | * | 9/1993 | Lunk et al. | 524/120 |
| 5,521,236 A | * | 5/1996 | Moy et al. | 524/101 |
| 5,674,589 A | * | 10/1997 | Bennett et al. | 428/149 |
| 5,674,947 A | * | 10/1997 | Oishi et al. | 525/289 |
| 5,919,536 A | * | 7/1999 | Bennett et al. | 428/35.5 |
| 5,972,445 A | * | 10/1999 | Kimura et al. | 428/35.4 |
| 6,130,311 A | * | 10/2000 | Kurz et al. | 528/272 |
| 6,270,888 B1 | * | 8/2001 | Rutter et al. | 428/347 |
| 6,521,351 B2 | * | 2/2003 | Murschall et al. | 428/480 |
| 6,849,325 B2 | * | 2/2005 | Murschall et al. | 428/212 |
| 6,869,991 B2 | * | 3/2005 | Murschall et al. | 524/91 |
| 6,875,803 B2 | * | 4/2005 | Murschall et al. | 524/91 |
| 6,939,600 B2 | * | 9/2005 | Murschall et al. | 428/212 |
| 2001/0018476 A1 | * | 8/2001 | Murschall et al. | 524/86 |
| 2002/0128358 A1 | * | 9/2002 | Murschall et al. | 524/115 |
| 2002/0136875 A1 | * | 9/2002 | Murschall et al. | 428/212 |
| 2002/0136879 A1 | * | 9/2002 | Murschall et al. | 428/220 |
| 2002/0136880 A1 | * | 9/2002 | Murschall et al. | 428/220 |
| 2002/0176978 A1 | * | 11/2002 | Murschall et al. | 428/220 |
| 2002/0187328 A1 | * | 12/2002 | Murschall et al. | 428/220 |
| 2003/0012937 A1 | * | 1/2003 | Murschall et al. | 428/220 |
| 2003/0017317 A1 | * | 1/2003 | Murschall et al. | 428/220 |
| 2003/0055136 A1 | * | 3/2003 | Murschall et al. | 524/100 |
| 2003/0068511 A1 | * | 4/2003 | Murschall et al. | 428/480 |

FOREIGN PATENT DOCUMENTS

| | | | |
|---|---|---|---|
| DE | 23 46 787 A1 | | 3/1975 |
| EP | 0 044 515 A1 | | 1/1982 |
| EP | 0 078 633 A1 | | 5/1983 |
| EP | 0 620 245 A1 | | 10/1994 |
| EP | 1 052 269 A1 | * | 4/2000 |
| GB | 2 344 596 A | | 6/2000 |
| WO | WO 98/06575 | * | 2/1998 |

OTHER PUBLICATIONS

Schimtz, Peter et al., "Films." Ullmann's Encyclopedia of Industrial Chemistry, 5th Ed., vol. A11 (1988), pp. 85-95, 108-110.*
Werner, Eberhard et al., "Polyester, Films." Encyclopedia of Polymer Science and Engineering, vol. 12 (1988), pp. 193-216.*
H. Day, D. M. Wiles Journal Applied Polymer Science vol. 16, p. 203, 1972.
Victor Wigotsky "Additives for Plastics" *Plastics Engineering, Society of Plastics Engineers, Inc.* Jun. 1999, Greenwich, Connecticut USA Bd. 55, Nr. 6, pp. 32-38 XP-000998046.
"Flammschutzadditive de Constab Polymer-Chemie", Gummi, fasern, Kunststoffe. Internationale Fachzeitschrift fur die Polymer-Verarbeitung, Gentner Verlag, Oct. 1995, Stuttgart, Germany Bd. 48, Nr. 10, pp. 695-697 XP-000993091.

* cited by examiner

*Primary Examiner*—Vivian Chen
(74) *Attorney, Agent, or Firm*—ProPat, L.L.C.

(57) ABSTRACT

The invention relates to a white, biaxially oriented film which comprises a crystallizable thermoplastic as main componet and is characterized by further comprising at least one UV-stabilizer, at least one white pigment and at least one flame-proofing agent, which is soluble in the thermoplastic and introduced directly, during the film production, by masterbatch technology, whereby the masterbatch is preconditioned by gradual heating under reduced pressure and with stirring.

28 Claims, No Drawings

WHITE FLAME-RESISTANT UV-STABLE FILM MADE FROM A CRYSTALLIZABLE THERMOPLASTIC, A METHOD FOR PRODUCTION AND THE USE THEREOF

The invention relates to a white, low-flammability, UV-resistant oriented film made from a crystallizable thermoplastic whose thickness is from 10 to 300 µm. The film comprises at least one white pigment and one flame retardant and one UV-stabilizer and has good orientability, very good optical and mechanical properties and can be produced cost-effectively. The invention further relates to the use of this film and to a process for its production.

BACKGROUND OF THE INVENTION

White, oriented films made from crystallizable thermoplastics of thickness from 10 to 300 µm are well known.

These films comprise neither UV-stabilizer as a light-stabilizer nor flame retardants. For this reason, neither the films nor the items produced from them are suitable for outdoor applications where fire protection or low-flammability is required. The films do not pass the fire tests of DIN 4102 Part 2 and Part 1, nor that of UL 94.

In outdoor applications, even after a short period, the known films show yellowing and deterioration in mechanical properties, due to a photo-oxidative degradation by sunlight.

EP-A-0 620 245 describes films with improved heat resistance. These films comprise antioxidants suitable for scavenging free radicals formed in the film and for degrading any peroxide formed. However, this specification makes no proposal as to how the UV resistance of films of this type may be improved.

DE-A 2 346 787 describes a low-flammability plastic. Besides the plastic, the claims also cover the use of the plastic to give films and fibres.

When films were produced from this phospholane-modified polymer the following shortcomings were apparent:

The plastic is very susceptible to hydrolysis and has to be thoroughly pre-dried. When the plastic is dried using dryers of the prior art, the plastic cakes and a film can only be produced under very difficult conditions.

The films produced under extreme and uneconomic conditions embrittle at high temperatures, that is to say their mechanical properties decline sharply as a result of rapid embrittlement, making the film unusable industrially. This embrittlement arises after as little as 48 hours at high temperatures.

The object of the present invention was to provide a white, flame retardant, UV resistant, oriented film having a thickness of from 10 to 300 µm, which can be produced cost-effectively, can readily be oriented and has good mechanical and optical properties and above all is flame retardant and does not embrittle at high temperatures and has a high UV resistance.

Flame retardancy means that the white film comprises with the conditions of DIN 4102 Part 2 and in particular the conditions of DIN 4102 Part 1 in tests known as fire protection tests, and can be assigned to construction materials class B2 and in particular B1 for low-flammability materials.

The film should also pass the UL 94 test known as the "Vertical Burning Test for Flammability of Plastic Material", so that it can be placed in class 94 VTM-O. This means that the film is no longer burning 10 seconds after removal of a Bunsen burner and that after 30 seconds there is no smouldering, and also that there are no drops of burning material during the entire period of the test.

High UV-resistance means that the films suffer no damage or only extremely little damage when exposed to sunlight or other UV-radiation, and therefore that the films are suitable for outdoor applications and/or critical indoor applications. In particular when the films are used outdoors for a number of years they should in particular not yellow, nor become brittle and not have surface-cracking, and also have unimpaired mechanical properties. High UV-resistance therefore implies that the film absorbs the UV light and does not transmit light until the visible region has been reached.

Good optical properties mean for example a homogeneous coloring, high surface gloss (>15), low luminous transmittance (<70%) and unmodified yellowing compared to films supplied with flame protection and UV.

Good mechanical properties include, inter alia, a high modulus of elasticity ($E_{MD}$>3200 N/mm$^2$; $E_{TD}$>3500 N/mm$^2$), and also good tear strengths (in MD>100 N/mm$^2$; in TD>130 N/mm$^2$).

Good orientability includes excellent capabilities of the film for orientation during its production, both longitudinally and transversely, without break-offs.

Cost-effective production conditions include the capability of the plastic and of any other raw material components required for producing the low-flammability film to be dried with industrial dryers which comply with the prior art like vacuum dryers, fluidized bed dryers, or fixed-bed dryers (tower-dryers). It is important that these raw materials do not cake or undergo thermal degradation. These dryers operate at temperatures of from 100° to 170° C., at which the flame retardant plastics cake inside the dryer or extruder and the carbonized mass has to be removed, making film production impossible.

In the vacuum dryer, which has the most gentle drying action, the plastic passes through a range of temperatures of from about 30° C. to 130° C. at a pressure of 50 mbar. A process known as post-drying is then required, in a hopper at temperatures of from 100–130° C. with a residence time of from 3 to 6 hours. Even in this process, flame retardant plastics according to the prior art cake to an extreme extend.

For the purposes of the present invention, no embrittlement on exposure to high temperatures for a short period means that after 100 hours of heat treatment at 100° C. in a circulating-air drying cabinet the film has not embrittled and does not have poor mechanical properties.

BRIEF DESCRIPTION OF THE INVENTION

This object is achieved by a white film with a thickness of from 10–300 µm whose principal constituent is a crystallizable thermoplastic, wherein at least one white pigment and at least one UV stabilizer and at least one flame retardant are present in the film, where according to the invention at least the flame retardant, and preferably also the UV stabilizer, is fed as a masterbatch directly during production of the film.

DETAILED DESCRIPTION OF THE INVENTION

The white film comprises, as principal constituent, a crystallizable thermoplastic. Examples of suitable crystallizable or semicrystalline thermoplastics are polyethylene terephthalate, polybutylene terephthalate and polyethylene naphthalate, preferably polyethylene terephthalate.

For the purposes of the present invention, crystallizable thermoplastics are crystallizable homopolymers, crystallizable copolymers, crystallizable compounds, crystallizable recycled material and other types of crystallizable thermoplastics.

The white film may have either one layer or more than one layer. The white film may likewise have been coated with various copolyesters or adhesion promoters.

The white film comprises at least one UV stabilizer and one flame retardant and for the purpose of homogeneous coloring at least one white pigment. It is appropriate for the UV stabilizer likewise to be fed directly by way of what is known as masterbatch technology during production of the film, and the concentration of the UV stabilizer is preferably from 0.01 to 5% by weight, based on the weight of the layer of the crystallizable thermoplastic.

According to the invention, the flame retardant is fed directly by way of what is known as masterbatch technology during production of the film, and the concentration of flame retardant is from 0.5 to 30% by weight, preferably from 1 to 20% by weight, based on the weight of the layer of the crystallizable thermoplastic.

The white pigment is also preferably fed in by way of masterbatch technology or during production of the polymer. The concentration of the white pigment is between 0.2 and 40% by weight, preferably between 0.5 and 25% by weight based on the weight of the cristallizable thermoplastic.

Suitable white pigments are preferably titanium dioxide, barium sulfate, calcium carbonate, kaolin, silica, with titanium dioxide and barium sulfate being preferred.

The titanium dioxide particles may be of the anatas or rutil, preferably mainly of the rutil, which compared to anatas has a higher power. In a preferred embodiment the titanium dioxide particles consist at least of 95% by weight of rutil. They can be manufactured in a common way, e.g. according to the chloride or sulfate process. Its amount in the base layer is 0.3 to 25% by weight based on the base layer, its average particle seize is relatively small and preferably within 0.10 to 0.30 μm.

Using the above titanium dioxide particles in film production do not yield in voids in the polymer matrix.

The titanium dioxide particles may have a coating of inorganic oxides, as they are commonly used as coating for $TiO_2$ white pigments in papers or paints to improve light stability.

It is known that $TiO_2$ is photo-active. UV rays form free radicals on the surface of the particle. These free radicals can migrate to the film forming polymers which leads to decomposition reactions and yellowing. Specifically suitable oxides are oxides of aluminum, silicon, zinc, or magnesium or mixtures of two or more of these compounds. $TiO_2$ particles with a coating of more of these compounds are disclosed in EP-A-0 044 515 and EP-A-0 078 633. Moreover, the coating can also comprise organic compounds with polar or non-polar groups. The organic compounds must be sufficiently thermostable during film production by polymer extruders. Polar groups are for example —OH; —OR; —COOX; (X=R; H or Na, R=alkyl with 1–34 C-atoms). Preferred organic compounds are alkanoles and fatty acids with 8–30 C-atoms in the alkyl group, specifically fatty acids and primary n-alkanoles with 12–24 C-atoms, as well as polydiorgano siloxanes and/or polyorgano hydrogen siloxanes like for example polydimethyl siloxane and polymethyl hydrogen siloxane.

The coating of the titanium dioxide particles usually consists of 1 to 12, specifically 2 to 6 g of inorganic oxides and 0.5 to 3, specifically 0.7 to 1.5 g of organic compounds, based on 100 g of titanium dioxide particles. The coating is applied to the particles in aqueous suspension. The inorganic oxides are precipitated from water soluble compounds e.g. alkali-, specifically sodium nitrate, sodium silicate (waterglas) or silicic acid.

According to the invention, inorganic oxides like $Al_2O_3$ or $SiO_2$ are also hydroxides or their various dihydrated forms like oxihydrates, without exactly knowing their exact composition and structure. After calcinig and grinding the oxihydrates of e.g. the aluminum and/or silicon are precipitated onto the $TiO_2$ pigment in aqueous suspension; the pigments are then washed and dried. This precipitation therefore can be carried out immediately in a suspension as it is obtained in the manufacturing process after calcining and subsequent wet grinding. The precipitation of the oxides and/or oxihydrates of the corresponding metals is carried out within the water soluble metal salts in a known pH range for example if aluminum sulfate is used in aqueous solution (pH <4) and the oxihydrate is precipitated through the addition of aqueous ammonia solution or sodium hydroxide in a pH range of between 5 and 9, preferably between 7 and 8.5. Based on a waterglas or alkalialuminate solution, the pH of the $TiO_2$ suspension should be extremely caustic (pH >8). The precipitation is initiated by addition of mineral acids like sulfuric acid in a pH of 5 to 8. After the precipitation of the metal oxides the suspension is stirred for 15 minutes to about 2 hours, which leads to an aging of the precipitated layers. The coated product is seperated from the aqueous dispersion and dried after washing at elavated temperatures, specifically at 70 to 100° C.

Light, in particular the ultraviolet content of solar radiation, i.e. the wavelength region from 280 to 400 nm, induces degradation in thermoplastics, as a result of which their appearance changes due to color change or yellowing, and there is also an adverse effect on mechanical/physical properties.

Inhibition of this photooxidative degradation is of considerable industrial and economic importance, since otherwise there are drastic limitations on the applications of many thermoplastics.

The absorption of UV light by polyethylene terephthalates, for example, starts at below 360 nm, increases markedly below 320 nm and is very pronounced at below 300 nm. Maximum absorption occurs at between 280 and 300 nm.

In the presence of oxygen it is mainly chain cleavage which occurs, but there is no cross-linking. The predominant photooxidation products in quantity terms are carbon monoxide, carbon dioxide and carboxylic acids. Besides the direct photolysis of the ester groups, consideration has to be given to oxidation reactions which likewise form carbon dioxide, via peroxide radicals.

In the photooxidation of polyethylene terephthalate there can also be cleavage of hydrogen at the position α to the ester groups, giving hydroperoxides and decomposition products of these, and this may be accompanied by chain cleavage (H. Day, D. M. Wiles: J. Appl. Polym. Sci 16, 1972, p. 203).

UV stabilizers, i.e. light stabilizers which are UV absorbers, are chemical compounds which can intervene in the physical and chemical processes of light-induced degradation. Carbon black and other pigments can give some protection from light. However, these substances are unsuitable for transparent films, since they cause discoloration or color change. The only compounds suitable for transparent matt films are those organic or organometallic compounds which produce no, or only extremely slight, color or color change in the thermoplastic to be stabilized, that is to say they are soluble in the thermoplastic.

For the purposes of the present invention, UV stabilizers suitable as light stabilizers are those which absorb at least 70%, preferably 80%, particularly preferably 90%, of the UV light in the wavelength region from 180 to 380 nm, preferably from 280 to 350 nm. These are particularly suitable if they are thermally stable in the temperature range from 260 to 300° C., that is to say they do not decompose and do not cause release of gases. Examples of UV stabilizers suitable as light stabilizers are 2-hydroxybenzophenones, 2-hydroxybenzotriazoles, organonickel compounds, salicylic esters, cinnamic ester derivatives, resorcinol monobenzoates, oxanilides, hydroxybenzoic esters, and sterically hindered amines and triazines, and among these preference is given to the 2-hydroxybenzotriazoles and the triazines.

The UV stabilizer(s) is (are) preferably present in the outer layer(s). The core layer may also have UV stabilizer, if required.

It was highly surprising that the use of the abovementioned UV stabilizers in films gave the desired result. The skilled worker would probably first have attempted to achieve a certain degree of UV resistance by way of an antioxidant, but would have found that the film rapidly yellows on weathering.

In the knowledge that UV stabilizers absorb UV light and therefore provide protection, the skilled worker would be likely to have used commercially available UV stabilizers. He would then have observed that the UV stabilizer has unsatisfactory thermal stability and at temperatures of from 200 to 240° C. decomposes and releases gases, and large amounts (from about 10 to 15% by weight) of the UV stabilizer have to be incorporated so that the UV light is absorbed and the film therefore not damaged.

At these high concentrations it would have been observed that the film is already yellow just after it has been produced, with Yellowness Index deviations (YID) around 25. It would also have been observed that its mechanical properties are adversely affected. Orientation would have produced exceptional problems, such as break-offs due to unsatisfactory strength, i.e. modulus of elasticity too low, die deposits, causing profile variations, a roller deposits from the UV stabilizer, causing impairment of optical properties (defective adhesion, nonuniform surface), and deposits in stretching frames or heat-setting frames, dropping onto the film.

It was therefore more than surprising that even low concentrations of the UV stabilizer achieve excellent UV protection. It was very surprising that, together with this excellent UV protection:

within the accuracy of measurement, the Yellowness Index of the film is unchanged from that of an unstabilized film;

there are no releases of gases, no die deposits and no frame condensation, and the film therefore has excellent optical properties and excellent profile and layflat, and the UV-stabilized film has excellent stretchability, and can therefore be produced in a reliable and stable manner on high-speed film lines at speeds of up to 420 m/min.

The novel film comprises at least one flame retardant, which is fed by way of what is known as masterbatch technology directly during production of the film, and the amount of flame retardant here is from 0.5 to 30.0% by weight, preferably from 1.0 to 20.0% by weight, based on the weight of the layer of the crystallizable thermoplastic. The ratio of flame retardant to thermoplastic is generally kept at from 60:40 to 10:90% by weight during preparation of the masterbatch.

Typical flame retardants include bromine compounds, chloroparaffines and other chlorine compounds, antimony trioxide, and alumina trihydrates, but the use of the halogen compounds here is disadvantageous due to the occurrence of halogen-containing byproducts. The low light resistance of films provided with these materials is moreover a great disadvantage, as is the evolution of hydrogen halides in the event of afire.

Examples of suitable flame retardants used according to the invention are organic phosphorus compounds, such as carboxyphosphinic acids, anhydrides of these and dimethyl methylphosphonate. A substantive factor according to the invention is that the organic phosphorus compound is soluble in the thermoplastic, since otherwise the optical properties required are not complied with.

Since the flame retardants generally have some susceptibility to hydrolysis, the additional use of a hydrolysis stabilizer may be desirable.

The hydrolysis stabilizers used are generally amounts of from 0.01 to 1.0% by weight of phenolic stabilizers, the alkali metal/alkaline earth metal stearates and/or the alkali metal/alkaline earth metal carbonates. The amounts of phenolic stabilizers used are preferably from 0.05 to 0.6% by weight, in particular from 0.15 to 0.3% by weight, and their molar mass is preferably above 500 g/mol. Particularly advantageous compounds are pentaerythrityl tetrakis-3-(3,5-di-tert-butyl-4-hydroxyphenyl)propionate and 1,3,5-trimethyl-2,4,6-tris(3,5-di-tert-butyl-4-hydroxybenzyl)benzene.

It was more than surprising, therefore, that by using masterbatch technology a suitable pre-drying and/or pre-crystallization procedure and, if desired, using small amounts of a hydrolysis stabilizer, it is possible to produce a low-flammability film with the required property profile in a cost-effective manner and without any caking in the dryer, and that on exposure to high temperature the film does not become brittle, and does not break when folded.

In one preferred embodiment, the novel low-flammability film comprises a crystallizable polyethylene terephthalate as principal constituent, as flame retardant from 1 to 20% by weight of an organic phosphorus compound soluble in the polyethylene terephthalate, and from 0.01 to 5.0% by weight of a PET-soluble UV absorber selected from the group consisting of the 2-hydroxybenzotriazoles or the triazines and 0.5 to 25% by weight of titanium dioxide with a particle diameter of preferably 0.10 to 0.50 μm, wherein a titanium dioxide of the rutil-type is preferred. Instead of titanium dioxide, barium sulfate with a particle diameter of 0.20 to 1.20 μm can be used as a white pigment, wherein the concentration is between 1.0 and 25% by weight. In a preferred embodiment mixtures of these white pigments or a mixture of one of these white pigments with a different one can be used.

In its particularly preferred embodiment, the novel film also comprises from 0.01 to 5.0% by weight of 2-(4,6-diphenyl-1,3,5-triazin-2-yl)-5-(hexyl)oxyphenol of the formula:

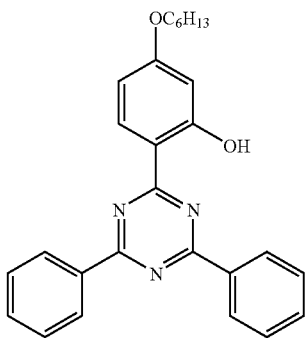

or from 0.01 to 5.0% by weight of 2,2-methylenebis(6-(2H-benzotriazol-2-yl)-4-(1,1,2,2-tetramethylpropyl)phenol of the formula:

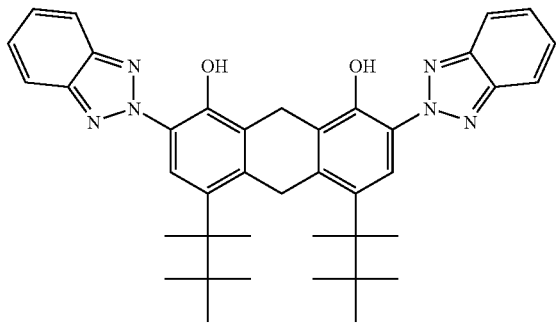

In another preferred embodiment it is also possible for mixtures of the two UV stabilizers mentioned or mixtures of at least one of the two UV stabilizers with other UV stabilizers to be used, where the total concentration of light stabilizer is preferably from 0.01 to 5.0% by weight, based on the weight of crystallizable polyethylene terephthalate.

The white, UV-resistant, low-flammability film has the following property profile:

The surface gloss, measured to DIN 67530 (measurement angle: 20°), is above 15, preferably above 20, the luminous transmittance L, measured to ASTM D 1003, is below 70%, preferably below 60%. These are surprisingly good properties for the UV resistance achieved in combination with the low flammability.

The standard viscosity SV (DCE) of the polyethylene terephthalate, measured in dichloroacetic acid to DIN 53728, is from 600 to 1000, preferably from 700 to 900.

The novel white polyethylene terephthalate film which comprises at least one inorganic white pigment and one UV stabilizer and one flame retardant may have one layer or else more than one layer.

In the embodiment having more than one layer, the film has a structure of at least one core layer and at least one outer layer, and particular preference is given here to a three-layer structure of type A-B-A or A-B-C.

A substantive factor for the embodiment having more than one layer is that the polyethylene terephthalate of the core layer has a standard viscosity similar to that of the polyethylene terephthalate of the outer layer(s) which is (are) adjacent to the core layer.

In one particular embodiment, the outer layers may also be composed of a polyethylene naphthalate homopolymer or of an polyethylene terephthalate-polyethylene naphthalate copolymer, or of a compound.

In this embodiment, the thermoplastics of the outer layers likewise have a standard viscosity similar to that of the polyethylene terephthalate of the core layer.

In the embodiment having more than one layer, the UV stabilizer is preferably present in the outer layers. The core layer may also have UV stabilizer, if required.

In the embodiment having more than one layer, the white pigment and the flame retardant are preferably present in the core layer, however, the outer layers may also have white pigment and/or flame retardant, if required.

In another embodiment, white pigment, flame retardants and UV stabilizer may also be present in the outer layers. If required and if fire-protection requirements are high, the core layer may additionally comprise what is known as a "base-level" flame retardant.

Unlike in the single-layer embodiment, the amounts given in % by weight for the concentrations of white pigment, flame retardant and of UV stabilizer are based on the weight of the thermoplastic in the provided layer.

There may also be provision, on at least one side of the film, of a scratch-resistant coating, a copolyester or an adhesion promoter.

Very surprisingly, weathering tests to the test specification of ISO 4892 using the Atlas C165 Weather-Ometer showed that in the case of a three-layer film the provision of UV stabilizers in the outer layers of from 0.5 to 2 µm in thickness is fully sufficient to improve UV resistance.

Again surprisingly, fire tests to DIN 4102 Part 1 and Part 2, and also the UL 94 test, have shown that novel films already fulfill the requirements at a thickness of from 10–300 µm.

The low-flammability, UV-stabilized films having more than one layer and produced by known coextrusion technology are therefore of major interest in economic terms when compared with fully UV-stabilized and flame-retardant monofilms, since markedly less additives are needed to achieve comparable low flammability and UV stability.

Weathering tests have shown that, even after from 5 to 7 years in an outdoor application (extrapolated from the specific weathering tests), the novel low-flammability, UV-stabilized films generally show no increase in yellowing, no embrittlement, no loss of surface gloss, no surface cracking and no impairment of mechanical properties.

During production of the film it was found that the low-flammability, UV-stabilized film can readily be oriented longitudinally and transversely without break-offs. In addition, no releases of gases of any type were found during the production process, and this is attributable to the presence of the UV stabilizer or the flame retardant. This is a substantive factor for the invention, since most conventional UV stabilizers and flame retardants evolve very undesirable and unpleasant gases, attributable to the decomposition of these compounds under the conditions of processing, at extrusion temperatures above 260° C., and are therefore of no use.

During the production of the white, low-flammability, UV-resistant film it was also found that the flame retardant can be incorporated using masterbatch technology and suitable predrying and/or pre-crystallization of the flame retardant masterbatch, without caking occurring in the dryer, and cost-effective production of the film is therefore possible.

Measurements showed that the novel film does not become brittle over a long period at high temperatures of 100° C., a fact which is more than surprising. This result is attributable to the synergistic action of suitable pre-crystallization, pre-drying, masterbatch technology and provision of UV stabilizer.

The novel film can moreover readily be recycled without pollution of the environment and without loss of mechanical properties, and examples of uses for which it is suitable are therefore short-lived promotional placards for constructing exhibition stands and other promotional requisites where fire protection is desirable.

An example of a production method for the novel, white, low-flammability, UV-resistant film is extrusion on an extrusion line.

It is particularly preferable for the white pigment and the UV stabilizer to be added by way of masterbatch technology. The UV stabilizer or the white pigment is fully dispersed in a solid carrier material. Carrier materials which may be used are certain resins, the thermoplastic itself, e.g. the polyethylene terephthalate, or else other polymers sufficiently compatible with the thermoplastic.

According to the invention, the UV stabilizer and the white pigment may be added at an early stage during production of the thermoplastic polymer, or fed into the extruder during production of the film.

It is important in masterbatch technology that the particle size and the bulk density of the masterbatch similar to the particle size and the bulk density of the thermoplastic, so that homogeneous distribution is achieved, and with this uniform UV stabilization can be achieved.

The polyester films may be produced by known processes from a polyester with, if desired, other polymers, with the flame retardant, with the white pigment, with the UV stabilizer and/or with other customary additives in customary amounts of from 1.0 to a maximum of 30% by weight, either in the form of a monofilm or else in the form of, if desired coextruded, films having more than one layer and with identical or differently constructed surfaces, where one surface may, for example, have been pigmented but no pigment is present at the other surface. Known processes may also have been used to provide one or both surfaces of the film with a conventional functional coating.

A substantive factor for the invention is that the masterbatch which comprises the flame retardant and, if used, the hydrolysis stabilizer, is pre-crystallized or pre-dried. This pre-drying includes gradual heating of the masterbatch at reduced pressure (from 20 to 80 mbar, preferably from 30 to 60 mbar, in particular from 40 to 50 mbar), with agitation, and, if desired, post-drying at a constant, elevated temperature, again at reduced pressure. It is preferable for the masterbatch to be charged at room temperature from a metering vessel in the desired blend together with the polymer of the base and/or outer layers and, if desired, with other raw material components batchwise into a vacuum dryer in which the temperature profile moves from 10 to 160° C., preferably from 20 to 150° C., in particular from 30 to 130° C., during the course of the drying time or residence time. During the residence time of about 6 hours, preferably 5 hours, in particular 4 hours, the raw material mixture is stirred at from 10 to 70 rpm, preferably from 15 to 65 rpm, in particular from 20 to 60 rpm. The resultant pre-crystallized or pre-dried raw material mixture is post-dried in a downstream vessel, likewise evacuated, at temperatures of from 90 to 180° C., preferably from 100 to 170° C., in particular from 110 to 160° C., for from 2 to 8 hours, preferably from 3 to 7 hours, in particular from 4 to 6 hours.

In the preferred extrusion process for producing the polyester film, the molten polyester material is extruded through a slot die and quenched on a chill roll, in the form of a substantially amorphous pre-film. This amorphous pre-film is then reheated and stretched longitudinally and transversely, or transversely and longitudinally, or longitudinally, transversely and again longitudinally and/or transversely. In general, the stretching temperatures are from $T_g+10°$ C. to $T_g+60°$ C. (where $T_g$ is the glass transition temperature), the longitudinal stretching ratio is usually from 2 to 6, in particular from 3 to 4.5, and the transverse stretching ratio is from 2 to 5, in particular from 3 to 4.5, and the ratio for any second longitudinal or transverse stretching carried out is from 1.1 to 5. The first longitudinal stretching may, if desired, be carried out simultaneously with the transverse stretching (simultaneous stretching). This is followed by the heat-setting of the film at oven temperatures of from 180 to 260° C., in particular from 220 to 250° C. The film is then cooled and wound up.

It was more than surprising, therefore, that by using masterbatch technology a suitable pre-drying and/or pre-crystallization procedure it is possible to produce a film with the required property profile in a cost-effective manner and without any caking in the dryer, and that on exposure to high temperature the film does not become brittle.

It was very surprising that, together with this excellent result and with the flame retardancy required and with the high UV resistance:

within the accuracy of measurement, there is no adverse effect on the Yellowness Index of the film, compared with that of an unmodified film;

there are no releases of gases, no die deposits and no frame condensation, and the film therefore has excellent optical properties and excellent profile and layflat, and the low-flammability UV-stabilized film has excellent stretchability, and can therefore be produced in a reliable and stable manner on high-speed film lines at speeds of up to 420 m/min.

The film is therefore also cost-effective.

It was also very surprising that the cut film material can moreover be reused as regrind for production of the film without any adverse effect on the Yellowness Index of the film.

The surprising combination of excellent properties makes the novel film highly suitable for a variety of different applications, such as interior decoration, for constructing exhibition stands, for exhibition requisites, for displays, for placards, for protective glazing of machines or vehicles, in the lighting sector, in fitting out shops or stores, or as a promotional requisite or laminating material, for greenhouses, roofing systems, exterior cladding, protective coverings, applications in the construction sector illuminated advertizing profiles or blinds or electrical applications.

The examples below illustrate the invention in more detail.

The following standards and methods are used here when testing individual properties.

Test Methods

Surface Gloss

Surface gloss is measured with a measurement angle of 20° to DIN 67530.

Luminous Transmittance

For the purposes of the present invention, the luminous transmittance is the ratio of total light transmitted to the amount of incident light.

Luminous transmittance is measured using "®HAZE-GARD plus" test equipment to ASTM D 1003.

Haze

Haze is that percentage proportion of the transmitted light which deviates by more than 2.5° from the average direction of the incident light beam. Clarity is determined at an angle of less than 2.5°.

The haze is measured using "HAZEGARD plus" apparatus to ASTM D 1003.

Surface Defects

Surface defects are determined visually.

Mechanical Properties

The modulus of elasticity, tear strength and elongation at break are measured longitudinally and transversely to ISO 527-1-2.

SV (DCA) and IV (DCA)

The standard viscosity SV (DCA) is measured by a method based on DIN 53726 in dichloroacetic acid.

The intrinsic viscosity (IV) is calculated as follows from the standard viscosity (SV)

$$IV(DCA)=6.67 \cdot 10^{-4} SV(DCA)+0.118$$

Fire Performance

Fire performance is determined to DIN 4102, Part 2, construction materials class B2, and to DIN 4102, Part 1, construction materials class B1, and also by the UL 94 test.

Weathering (on Both Sides) and UV Resistance

UV resistance is tested as follows to the test specification of ISO 4892

| | |
|---|---|
| Test equipment | Atlas Ci 65 Weather-Ometer |
| Test conditions | ISO 4892, i.e. artificial weathering |
| Irradiation time | 1000 hours (per side) |
| Irradiation | 0.5 W/m², 340 nm |
| Temperature | 63° C. |
| Relative humidity | 50% |
| Xenon lamp | Internal and external filter made from borosilicate |
| Irradiation cycles | 102 minutes of UV light, then 18 minutes of UV light with water spray onto the specimens, then another 102 minutes of UV light, etc. |

Yellowness Index

The Yellowness Index YID is the deviation from the colorless condition in the "yellow" direction and is measured to DIN 6167.

In the examples and comparative examples below each of the films is a transparent film of different thickness, produced on the extrusion line described.

Each of the films was first weathered to the test specification of ISO 4892 for 1000 hours per side, using an Atlas Ci 65 Weather-Ometer, and then tested for mechanical properties, Yellowness Index (YID), surface defects, luminous transmittance and gloss.

The fire tests to DIN 4102, Part 2 and Part 1, and the UL 94 test, were carried out on each film.

EXAMPLE 1

A transparent film of 50 μm thickness is produced, comprising polyethylene terephthalate as principal constituent, 7.0% by weight of titanium dioxide and 1.0% by weight of the UV stabilizer 2-(4,6-diphenyl-1,3,5-triazin-2-yl)-5-hexyloxyphenol (®Tinuvin 1577) and 2.0% by weight of the flame retardant. The flame retardant is the organic phosphorcompound dimethyl-methylphosphonate, which is soluble in the PET (Amgard P1045 by Albright & Wilson)

The titanium dioxide is of the rutil type, has an average particle diameter of 0.20 μm and is coated with $Al_2O_3$.

Tinuvin 1577 has a melting point of 149° C. and is thermally stable up to about 330° C.

To obtain homogeneous distribution, the titanium dioxide and the UV stabilizer are incorporated directly into the PET when the polymer is prepared.

The flame retardant is likewise fed in the form of a masterbatch. The masterbatch is composed of 10% by weight of flame retardant (dimethyl-methylphosphonate) and 80% by weight of PET having a bulk density of 750 kg/m³.

The PET used for production of the film and the PET used for production of the masterbatch have a standard viscosity SV (DCA) of 810, corresponding to an intrinsic viscosity IV (DCA) of 0.658 dl/g.

50% by weight of PET, 30% by weight of recycled PET material and 20% by weight of masterbatch are discharged at room temperature from separate metering vessels into a vacuum dryer which operates with a temperature profile of from 25 to 130° C. from the time of charging to the end of the residence time. During the residence time of about 4 hours, the mixture of raw materials is agitated at 61 rpm.

The pre-crystallized and/or pre-dried mixture of raw materials is post-dried for 4 hours at 140° C. in a downstream hopper, again in vacuo. The 50 μm monofilm is then produced by the extrusion process described.

The individual steps of production were:

| | | |
|---|---|---|
| Longitudinal stretching | Temperature: | 85–135° C. |
| | Longitudinal stretch ratio: | 4.0:1 |
| Transverse stretching | Temperature: | 85–135° C. |
| | Transverse stretch ratio: | 4.0:1 |
| Heat setting | Temperature: | 230° C. |

The white PET film produced has the following property profile:

| | | |
|---|---|---|
| Thickness | | 50 μm |
| Surface gloss, | Side 1 | 72 |
| (Measurement angle 20°) | Side 2 | 68 |
| Luminous transmittance | | 28% |
| Surface defects per m² | | none |
| Longitudinal modulus of elasticity | | 4300 N/mm² |
| Transverse modulus of elasticity | | 5600 N/mm² |
| Longitudinal tear strength | | 190 N/mm² |
| Transverse tear strength | | 280 N/mm² |
| Yellowness Index (YID) | | 48 |
| Coloring | | homogeneous |

The film complies with the requirements for construction material classes B2 and B1 to DIN 4102 Part 2/Part 1. The film passes the UL 94 test.

After 200 hours of heat treatment at 100° C. in a circulating-air drying cabinet there is no change in mechanical properties. The film shows no embrittlement phenomena of any kind.

After in each case 1000 hours of weathering per side with the Atlas CI 65 Weather-Ometer, the PET film has the following properties:

| | | |
|---|---|---|
| Thickness | | 50 μm |
| Surface gloss, | Side 1 | 65 |

|  |  |  |
|---|---|---|
| (Measurement angle 20°) | Side 2 | 60 |
| Luminous transmittance | | 35% |
| Surface defects per m² | | none |
| Longitudinal modulus of elasticity | | 4050 N/mm² |
| Transverse modulus of elasticity | | 5500 N/mm² |
| Longitudinal tear strength | | 151 N/mm² |
| Transverse tear strength | | 238 N/mm² |
| Yellowness Index (YID) | | 49 |

EXAMPLE 2

Coextrusion technology is used to produce a multilayer PET film having the layer sequence A-B-A and a thickness of 17 μm, B being the core layer and A being the outer layers. The core layer has a thickness of 15 μm, and each of the two outer layers, which cover the core layer, has a thickness of 1 μm.

The polyethylene terephthalate used for the core layer B is identical with the polymer of Example 1 except that it comprises no UV stabilizer.

The core layer further comprises 2% by weight of flame retardant (dimethyl-methylphosphonate) which is fed in the form of a masterbatch. The masterbatch is composed of 10% by weight of flame retardant and 90% by weight of PET.

The PET of the outer layers has a standard viscosity SV (DCA) of 810 and has 1% by weight of tinuvin 1577 and 0.3% by weight of Sylobloc. The outer layers comprise no titanium dioxide and no flame retardant.

For the core layer, 50% by weight of polyethylene terephthalate, 30% by weight of recycled polyethylene terephthalate material and 20% by weight of the masterbatch were pre-crystallized, pre-dried and post-dried as in Example 1.

The outer layer polymer is not subjected to any particular drying. Coextrusion technology is used to produce a film having the layer sequence A-B-A and having a thickness of 17 μm and the following property profile:

|  |  |  |
|---|---|---|
| Layer structure | | A-B-A |
| Thickness | | 17 μm |
| Surface gloss, | Side 1 | 134 |
| (Measurement angle 20°) | Side 2 | 128 |
| Luminous transmittance | | 48% |
| Surface defects | | none |
| (cracks, embrittlement) | | |
| Longitudinal modulus of elasticity | | 4100 N/mm² |
| Transverse modulus of elasticity | | 4720 N/mm² |
| Longitudinal tear strength | | 180 N/mm² |
| Transverse tear strength | | 205 N/mm² |
| Yellowness Index (YID) | | 12.9 |
| Coloring | | homogeneous |

After 200 hours of heat treatment at 100° C. in a circulating-air drying cabinet there is no change in mechanical properties. The film shows no embrittlement phenomena of any kind.

The film complies with the requirements for construction material classes B2 and B1 to DIN 4102 Part 2 and Part 1. The film passes the UL 94 test.

After in each case 1000 hours of weathering per side with the Atlas CI 65 Weather-Ometer the PET film has the following properties:

|  |  |  |
|---|---|---|
| Layer structure | | A-B-A |
| Thickness | | 17 μm |
| Surface gloss, | Side 1 | 125 |
| (Measurement angle 20°) | Side 2 | 115 |
| Luminous transmittance | | 45% |
| Surface detects | | none |
| (cracks, embrittlement) | | |
| Longitudinal modulus of elasticity | | 3950 N/mm² |
| Transverse modulus of elasticity | | 4610 N/mm² |
| Longitudinal tear strength | | 150 N/mm² |
| Transverse tear strength | | 190 N/mm² |
| Yellowness Index (YID) | | 15.1 |
| Coloring | | homogeneous |

EXAMPLE 3

As in Example 2, an A-B-A film of 20 μm thickness was produced, the core layer B having a thickness of 16 μm and each outer layer A having a thickness of 2 μm.

The core layer B comprises only 5% by weight of the flame retardant masterbatch of Example 2.

The outer layers are identical with those of Example 2, except that they additionally comprise 20% by weight of the flame retardant masterbatch, used in Example 2 only for the core layer.

The polymers and the masterbatches for the core layer and the outer layers are pre-crystallized, pre-dried and post-dried as in Example 1. The multilayer 20 μm film produced using coextrusion technology has the following property profile:

|  |  |  |
|---|---|---|
| Layer structure | | A-B-A |
| Thickness | | 20 μm |
| Surface gloss, | Side 1 | 131 |
| (Measurement angle 20°) | Side 2 | 125 |
| Luminous transmittance | | 42% |
| Surface defects | | none |
| (cracks, embrittlement) | | |
| Longitudinal modulus of elasticity | | 4000 N/mm² |
| Transverse modulus of elasticity | | 4700 N/mm² |
| Longitudinal tear strength | | 180 N/mm² |
| Transverse tear strength | | 205 N/mm² |
| Yellowness Index (YID) | | 13.1 |

After 200 hours of heat treatment at 100° C. in a circulating-air drying cabinet there is no change in mechanical properties. The film shows no embrittlement phenomena of any kind.

The film complies with the requirements for the construction material classes B2 and B1 to DIN 4102 Part 2 and Part 1. The film passes the UL 94 test.

After in each case 1000 hours of weathering per side with the Atlas CI 65 Weather-Ometer the PET film has the following properties:

|  |  |  |
|---|---|---|
| Layer structure | | A-B-A |
| Thickness | | 20 μm |
| Surface gloss, | Side 1 | 124 |
| (Measurement angle 20°) | Side 2 | 116 |
| Luminous transmittance | | 38% |
| Surface defects | | none |
| (cracks, embrittlement) | | |
| Longitudinal modulus of elasticity | | 3800 N/mm² |
| Transverse modulus of elasticity | | 4490 N/mm² |
| Longitudinal tear strength | | 145 N/mm² |
| Transverse tear strength | | 170 N/mm² |
| Yellowness Index (YID) | | 16.1 |

COMPARATIVE EXAMPLE 1

Example 2 is repeated, except that the film is not provided with UV stabilizers, nor with flame retardant masterbatch.

The property profile of the film without these additives is comparable with that of the film of Example 2, which has these additives.

The film without these additives does not pass the tests to DIN 4102, Part 1 and Part 2, or the UL 94 test.

After 1000 hours of weathering per side with the Atlas Ci Weather-Ometer, the film shows surface cracking and embrittlement phenomena. It is therefore no longer possible to measure a precise property profile—in particular to measure mechanical properties. The film is also visibly yellow.

The invention claimed is:

1. A white, biaxially oriented film comprising a crystallizable thermoplastic as the principal constituent and further comprising at least one UV stabilizer, at least one white pigment and at least one flame retardant which is soluble in the thermoplastic, said film exhibiting a modulus of elasticity as measured to ISO 527-1-2 of above about 3200 N/mm$^2$ longitudinally after 100 hours of heat treatment at 100° C., wherein the crystallizable thermoplastic is selected from the group consisting of polyethylene terephthalate, polybutylene terephthalate, polyethylene naphthalate and mixtures made from these thermoplastics.

2. The film as claimed in claim 1, wherein the concentration of the UV stabilizer is from about 0.01 to about 5% by weight, based on the weight of the crystallizable thermoplastic.

3. The film as claimed in claim 1, wherein the UV stabilizer has been selected from the group consisting of 2-hydroxybenzotriazoles, triazines and mixtures of these.

4. The film as claimed in claim 3, wherein the UV stabilizer is 2-(4,6-diphenyl-1,3,5-triazin-2-yl)-5-hexyloxyphenol or 2,2'-methylenebis(6-(2H-benzotriazol-2-yl)-4-(1,1,3,3-tetramethylbutyl)phenol or 2-(4,6-diphenyl-1,3,5-trlazin-2-yl)-5-hexyloxyphenol and 2,2'-methylenebis(6-(2H-benzotriazol-2-yl)-4-1,1,3,3-tetramethylbutyl)phenol.

5. The film as claimed in claim 1, wherein the flame retardant consists essentially of organic phosphorus compounds.

6. The film as claimed in claim 5, wherein the flame retardant is dimethyl methylphosphonate.

7. The film as claimed in claim 5, wherein from about 0.5 to about 30.0% by weight of flame retardant is present in the film.

8. The film as claimed in claim 1, wherein the white pigment is one or more white pigments selected from the group consisting of titanium dioxide, barium sulfate, calcium carbonate, kaolin and silicon dioxide.

9. The film as claimed in claim 8, wherein the white pigment is titanium dioxide.

10. The film as claimed in claim 1, wherein the white pigment is coated.

11. The film as claimed in claim 1, wherein the amount of white pigment, based on the weight of the polymer layer in which the white pigment is present, is from about 0.2 to about 40% by weight.

12. The film as claimed in claim 1, wherein the average particle size of the white pigment is from about 0.10 to about 0.30 μm.

13. The film as claimed in claim 1, wherein the surface gloss, measured to DIN 67530 (measurement angle 20°), is above about 15.

14. The film as claimed in claim 1, wherein the luminous transmittance, measured to ASTM D 1003, is below about 70%.

15. The film as claimed in claim 14, wherein the luminous transmittance ranges from 28 to 60%.

16. The film as claimed in claim 1, wherein the modulus of elasticity, measured to ISO 527-1-2, is above about 3200 N/mm$^2$ longitudinally and above about 3500 N/mm$^2$ transversely.

17. The film as claimed in claim 1, wherein the crystallizable thermoplastic comprises polyethylene terephthalate.

18. The film as claimed in claim 17, wherein recycled material is present in the film.

19. The film as claimed in claim 1, wherein the film has a single-layer structure.

20. The film as claimed in claim 1, wherein the film has a structure of more than one layer with at least one outer layer and with at least one core layer.

21. The film as claimed in claim 20, wherein the structure of more than one layer has two outer layers and a core layer lying between the outer layers.

22. The film as claimed in claim 20 or 21, wherein at least one UV stabilizer is present in the outer layer or layers.

23. The film as claimed in claim 20, wherein at least one white pigment is present in the base layer.

24. The film as claimed in claim 20, wherein at least one flame retardant is present in the base layer.

25. A process for producing a thermoplastic film as claimed in claim 1, in which a crystallizable thermoplastic is melted in at least one extruder and the resultant polymer melt corresponding to the composition of the film layer is introduced into a die, or the resultant polymer melts corresponding to the compositions of the outer and base layers are introduced into a coextrusion die, and these are extruded from the die onto a chill roll, and the resultant pre-film is then biaxially oriented and heat-set, wherein at least one flame retardant or white pigment or flame retardant and white pigment is present in the polymer melt or melts for the base layer or for the outer layer or layers or for the base layer and the outer layer or layers and at least one UV stabilizer is present in the polymer melt for the outer layer or layers.

26. The process as claimed in claim 25, wherein the addition of one or more of the flame retardant, UV stabilizer and white pigment takes place by way of masterbatch technology.

27. A method of making an interior decoration, a display, a placards, a protective glazing, a shop outfit, a promotional requisite, a laminating medium, an exterior cladding, a protective covering, an illuminated advertising profile, or a blind, which comprises converting a film as claimed in claim 1 into an interior decoration, a display, a placards, a protective glazing, a shop outfit, a promotional requisite, a laminating medium, an exterior cladding, a protective covering, an illuminated advertising profile, or a blind.

28. A biaxially oriented polyester film comprising a base layer disposed between first and second outer layers, said film comprising crystallizable thermoplastic, at least one UV stabilizer, at least one white pigment and at least one flame retardant which is soluble in the thermoplastic, wherein (i) said at least one V stabilizer is absent from said base layer and
(ii) said at least one flame retardant and said at least one white pigment are both absent from said first and second outer layers.

* * * * *

UNITED STATES PATENT AND TRADEMARK OFFICE
CERTIFICATE OF CORRECTION

| | | |
|---|---|---|
| PATENT NO. | : 7,186,455 B2 | Page 1 of 1 |
| APPLICATION NO. | : 10/181505 | |
| DATED | : March 6, 2007 | |
| INVENTOR(S) | : Murschall et al. | |

It is certified that error appears in the above-identified patent and that said Letters Patent is hereby corrected as shown below:

Claims

Column 15
Claim 4, Line 39, delete "trlazin" insert --triazin --
Claim 4, Line 40, insert --(-- immediately following "4"

Column 16
Claim 28, Line 60, insert --U-- immediately preceeding "V stabilizer is absent from"

Signed and Sealed this

First Day of May, 2007

JON W. DUDAS
*Director of the United States Patent and Trademark Office*